United States Patent

Matsuo

(10) Patent No.: US 6,845,182 B2
(45) Date of Patent: Jan. 18, 2005

(54) IMAGE RECORDING SYSTEM AND METHOD FOR CONTROLLING THE IMAGE RECORDING SYSTEM

(75) Inventor: Toshihisa Matsuo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 600 days.

(21) Appl. No.: 10/054,159

(22) Filed: Nov. 12, 2001

(65) Prior Publication Data

US 2002/0110287 A1 Aug. 15, 2002

(30) Foreign Application Priority Data

Nov. 13, 2000 (JP) ........................................ 2000-345716

(51) Int. Cl.[7] ................................................. G06K 9/54
(52) U.S. Cl. ...................... 382/305; 382/307; 358/403; 358/404; 348/211.6; 348/231.1; 348/567
(58) Field of Search ................................ 382/303, 305, 382/307; 358/403, 404, 435, 436; 348/211.6, 231.1, 523, 567

(56) References Cited

U.S. PATENT DOCUMENTS

| | | | | |
|---|---|---|---|---|
| 5,583,561 A | * | 12/1996 | Baker et al. .................. | 725/93 |
| 5,586,240 A | * | 12/1996 | Khan et al. .................. | 715/508 |
| 5,652,830 A | * | 7/1997 | Yamamoto et al. ......... | 358/1.16 |
| 5,802,018 A | * | 9/1998 | Kim et al. ................ | 369/30.28 |
| 5,818,512 A | * | 10/1998 | Fuller .......................... | 725/82 |
| 5,923,367 A | * | 7/1999 | Tsunekawa et al. .... | 348/207.99 |

FOREIGN PATENT DOCUMENTS

| | | |
|---|---|---|
| JP | 6251562 | 9/1994 |
| JP | 10172237 | 6/1998 |
| JP | 11176082 | 7/1999 |

* cited by examiner

*Primary Examiner*—Yon J. Couso
*Assistant Examiner*—Yosef Kassa
(74) *Attorney, Agent, or Firm*—Edwards & Angell, LLP; David G. Conlin; George W. Hartnell, III

(57) ABSTRACT

A CPU detects the available space A of a first recording medium, the available space B of a second recording medium and a preprogrammed image information amount C necessary for preprogrammed recording by first and second recording medium space managing portions and the contents of preprogrammed recording input from an operation portion by the user. When the preprogrammed image information amount C is larger than the available space A of the first recording medium, an amount of shortage in recording space for preprogrammed information D is obtained from the CPU by subtracting the available space A of the first recording medium from the preprogrammed image information amount C. A larger amount of image information than the recording space shortage D is selected from the image information stored on the first recording medium, and the selected image information is moved to the second recording medium.

8 Claims, 7 Drawing Sheets

IMAGE RECORDING SYSTEM AND METHOD FOR CONTROLLING THE IMAGE RECORDING SYSTEM

BACKGROUND OF THE INVENTION

1. Field of the Invention

The present invention relates to an image recording system having a function of receiving image information and a function of performing preprogrammed recording of the received image information onto a plurality of recording media, and a method for controlling the image recording system.

2. Description of the Related Art

Recently, in the broadcasting industry, a shift toward digital broadcasting has been accelerated, and high quality images and high quality sounds are aimed. For these reasons, the amount of image information in broadcasting reaches approximately several tens of Mbps in information rate. As specifications required of an apparatus capable of recording this image, it is necessary that the information recording rate be higher than the broadcast information rate and the apparatus have a recording capacity of approximately several tens of GB (gigabyte) to realize recording for a considerable period of time. Examples of recording apparatuses capable of meeting these requirements include magnetic tape recording apparatuses, magnetic disk recording apparatuses (hard disk apparatuses) and optical disk recording apparatuses. Of these, magnetic tape recording apparatuses are poor in information accessing capability, and therefore, hard disk apparatuses and optical disk apparatuses are attracting attention as the next recording apparatuses. Particularly, hard disk apparatuses that have a sufficiently high recording rate and can have a sufficiently large recording capacity are sufficiently ready for recording of the above-mentioned high-quality broadcasts. Moreover, optical disk apparatuses capable of recording on exchangeable media although inferior to hard disk apparatuses in both recording rate and capacity are regarded as optimum as image storing apparatuses.

When these circumstances are considered, for example, a usage is considered such that a hard disk apparatus is used as a general-purpose image recording apparatus and when the user wants to store some of the recorded images, the images are stored on a medium by an optical disk apparatus. It is to be noted that another hard disk apparatus or a magnetic tape recording apparatus may be used as the means for storing images. Moreover, these apparatuses all have a preprogrammed recording function, and by enabling a target image to be recorded even during the user's absence by preprogramming the apparatus to record the target image, the image can be reproduced and viewed at the user's convenience. Thus, the preprogrammed recording function is one of the functions essential to these recording apparatuses.

When a larger amount of image information than the available space of the recording medium set in the image recording apparatus is recorded, the following occur:

(1) The user does not notice that the available space of the recording medium is smaller than the amount of the image information to be recorded, and the image information is interrupted when all the available space is used.

(2) The user takes out the recording medium with a small available space, and sets another recording medium with a sufficient available space in the apparatus. As means for solving these problems, the following technologies are proposed:

A multi-volume continuous recording apparatus disclosed in Japanese Unexamined Patent Publication JP-A 6-251562 (1994) has a buffer temporarily storing signals recorded on the recording medium, and by stopping the output of the buffer when the available space of the recording medium becomes small, resuming the output of the buffer after a different recording medium is set and performing recording, a long-time image can be recorded without the information interrupted when the recording medium is changed.

According to the information storage control method disclosed in Japanese Unexamined Patent Publication JP-A 10-172237 (1998), by stopping writing of data onto an external storage medium when it is determined that the data is not stored on the external storage medium and storing the data in internal storage means, the data scheduled to be stored can be stored without interrupted.

In a network recording control apparatus disclosed in Japanese Unexamined Patent Publication JP-A 11-176082 (1999), a data transmitter detects the remaining space of the recording medium of a data receiver forming a network, and by changing the receiver in the middle of data transmission when long-time image data is transmitted, data can be continuously recorded on a plurality of receivers.

As described above, image information larger than the available space of a recording medium is enabled to be recorded without interrupted by continuously recording the information on another recording medium or apparatus. This operation is performed by user himself or by an apparatus.

As described above, when a larger amount of image information than the available space of the recording medium set in the recording apparatus is recorded, the image can be recorded only to the middle or changing the recording medium places a load on the user. In the technologies disclosed in the patent applications, since one piece of image information is recorded being divided on two or more media, the management of recording media with respect to image information is complicated, and to seamlessly reproduce an image without any interruption at the points of division and without the same part of the image repeated, a recording and reproduction processing of the joints of the points of division of the information is required. This complicates the system and increases the price.

SUMMARY OF THE INVENTION

An object of the invention is to provide an image recording system and a method for controlling the image recording system in which the apparatus can be simplified by recording a larger amount of image information than the available space of the recording medium without dividing the information on a plurality of recording media.

The invention relates to an image recording system comprising: a first recording medium for image information recording; a second recording medium for image information storage; means for inputting image information transmitted from an outside, to the first recording medium; means for preprogramming to record image information; means for recognizing an amount of the image information preprogrammed to be recorded; means for managing an amount of each piece of image information recorded on the first recording medium and an available space of the first recording medium; means for managing an available space of the second recording medium; means for obtaining a recording space shortage for preprogrammed information by subtracting the available space of the first recording medium from the amount of the image information preprogrammed to be recorded; means for comparing the available space of the first recording medium, the preprogrammed image information amount, the recording space shortage for preprogrammed information, the amount of the image information already recorded on the first recording medium and the available space of the second recording medium; means for, in response to a comparison result of the comparing means, selecting a larger amount of image information than the recording space shortage for preprogrammed information, from the image information recorded on the first recording medium; and means for moving the image information selected by the selecting means from the first recording medium to the second recording medium.

According to the invention, the recording space shortage is obtained by subtracting the available space of the first recording medium from the preprogrammed image information amount, a larger amount of image information than the recording space shortage is selected from the image information recorded on the first recording medium and the selected image information is moved from the first recording medium to the second recording medium, so that a larger amount of image information than the available space of the recording medium can be recorded without being divided on a plurality of recording media. Consequently, the apparatus can be simplified.

Moreover, in the invention, it is preferable that the image recording system further provides means for providing a display indicating that the selected image information has been moved from the first recording medium to the second recording medium.

According to the invention, since a display indicating that the selected image information has been moved from the first recording medium to the second recording medium is provided, the user can be notified where the moved image information is recorded.

Moreover, an exchangeable recording medium may be used as the second recording medium. By using the exchangeable recording medium, information storing capability can be improved.

Moreover, a recording medium in a recording apparatus connected to the outside through a network may be used as the second recording medium. By using a recording medium in a recording apparatus connected to the outside through a network, the second recording medium can be selected from among a larger number of media.

Moreover, in the invention, it is preferable that the image recording system comprises a plurality of the second recording media; and means for managing an available space of each of the second recording media.

According to the invention, the image recording system comprises managing means for managing available spaces of the respective second recording media, so that a plurality of second recording media in a changer configuration type apparatus can be handled.

Moreover, in the invention, it is preferable that the image recording system comprises a plurality of the second recording media; means for managing an available space of each of the second recording media; and means for determining an order of priority of the plurality of the second recording media in moving the selected image information from the first recording medium to the second recording media.

According to the invention, in moving the selected image information from the first recording medium to the plurality of the second recording media, an order of priority of the plurality of the second recording media is determined by the determining means. For example, the recording media are used in increasing order of available space, so that recording media with large available spaces can be set aside.

Moreover, in the invention, it is preferable that the image recording system further comprises means for selecting a plurality of pieces of image information from the image information recorded on the first recording medium, amounts of the plurality of pieces of image information being larger than the recording space shortage.

According to the invention, since the image recording system further comprises means for selecting a plurality of pieces of image information the amounts of which are larger than the recording space shortage, from the image information recorded on the first recording medium, a larger available space can be secured than when one piece of image information is selected from the image information on the first recording medium.

Moreover, in the invention it is preferable that the image recording system further comprises means for carrying out reproduction of the image information moved from the first recording medium to the second recording medium, from the second recording medium.

According to the invention, since the image information moved from the first recording medium to the second recording medium is reproduced from the second recording medium, reproduction does not require much labor.

Moreover, the invention relates to a method for controlling an image recording system having a function of receiving image information and a function of performing preprogrammed recording of the received image information onto a plurality of recording media, the method comprising the steps of: detecting an available space A of a first recording medium, an available space B of a second recording medium and a preprogrammed image information amount C necessary for preprogrammed recording; comparing the available space A of the first recording medium and the preprogrammed image information amount C; obtaining, when the preprogrammed image information amount C is larger than the available space A of the first recording medium, an amount of shortage of recording space for preprogrammed image information D by subtracting the available space A of the first recording medium from the preprogrammed image information amount C; detecting amounts Ej (j is a natural number) of pieces of image information already stored on the first recording medium, and from the pieces of image information, selecting a piece of image information an amount of which is equal to or larger than the amount of shortage of recording space for preprogrammed image information D; moving the selected piece of image information to the second recording medium when the available space B of the second recording medium is equal to or larger than the amount Ej of the selected piece of image information; and permitting the preprogrammed recording onto the first recording medium.

According to the invention, the recording space shortage is obtained by subtracting the available space of the first recording medium from the preprogrammed image information amount, a piece of image information of which amount is larger than the recording space shortage is selected from pieces of image information recorded on the first recording medium and the selected piece of image information is moved from the first recording medium to the second recording medium, so that by recording a piece of image information of which amount is larger than the available space of the recording medium is recorded without dividing the information on a plurality of recording media, with the result that the apparatus can be simplified.

Moreover, in the invention, it is preferable that the movement of image information from the first recording medium to the second recording medium is carried out in decreasing order of image information amount.

According to the invention, since image information is moved in decreasing order of image information amount in the step of moving the selected image information to the second recording medium, the possibility can be reduced that image information is moved in the next preprogrammed recording.

According to the invention, a larger amount of image information than the available space of the recording medium can be recorded without being divided on a plurality of recording media, so that the apparatus can be simplified.

Moreover, according to the invention, the user can be notified where the moved image information has been recorded.

Moreover, according to the invention, information storing capability can be improved.

Moreover, according to the invention, the second recording medium can be selected from among a larger number of media.

Moreover, according to the invention, a plurality of second recording media, for example, in a changer configuration type system, can be handled.

Moreover, according to the invention, recording media are used in increasing order of available space, so that recording media with large available spaces can be set aside.

Moreover, according to the invention, a larger available space can be secured than when one piece of image information is selected from the image information on the first recording medium.

Moreover, according to the invention, reproduction of image information does not require much labor.

Moreover, according to the invention, the possibility can be reduced that image information is moved in the next preprogrammed recording.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
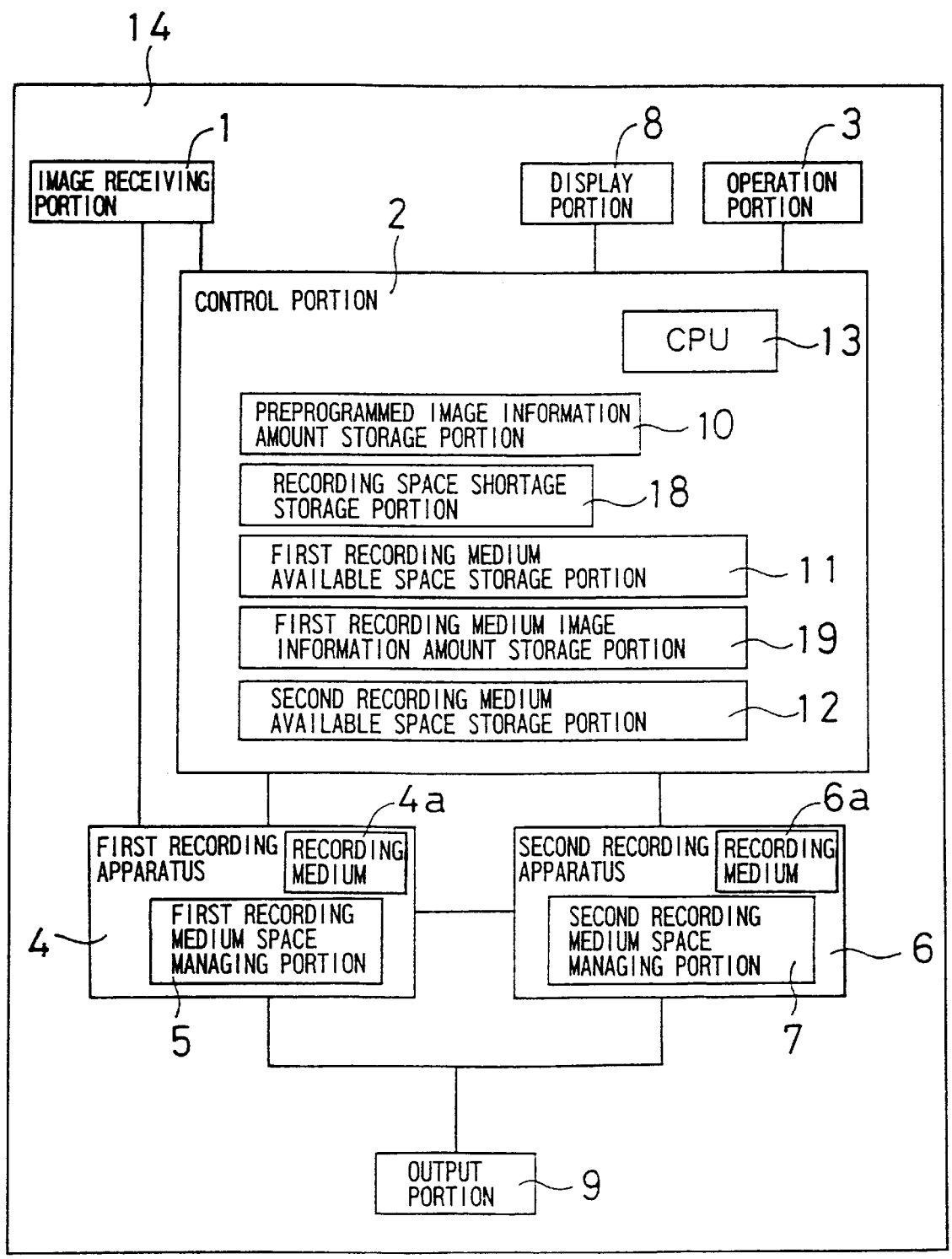
FIG. 1 is a block diagram showing the structure of an image recording system according to a first embodiment of the invention.

Now referring to the drawings, preferred embodiments of the invention are described below.

Hereinafter, embodiments of the invention will be described. FIG. 1 is a block diagram showing the structure of an image recording system 14 according to an embodiment of the invention. The image recording system 14 comprises an image receiving portion 1, a control portion 2, an operation portion 3, a first recording apparatus 4, a second recording apparatus 6, a display portion 8 and an output portion 9. The image receiving portion 1 is means for receiving external image information from a broadcasting station or the like and inputting the received information. The operation portion 3 is a portion where the user inputs an operation instruction of the image recording system 14 from the outside. The operation portion 3 is provided with non-illustrated switches and buttons and is also used for inputting the contents of programming when preprogrammed recording of an image is performed. A first recording medium 4a for image recording is incorporated in and controlled by the first recording apparatus 4. The amount of image information recorded on the first recording medium 4a and the available space of the first recording medium 4a are managed by a first recording medium space managing portion 5. Likewise, a second recording medium 6a for image storage is incorporated in and controlled by the second recording apparatus 6. The available space of the second recording medium 6a is managed by a second recording medium space managing portion 7. The first and the second recording apparatuses 4 and 6 also have a reproduction function, and reproduce the image information recorded on the recording media 4a and 6a so that the user can view the image through the output portion 9. The display portion 8 provides various kinds of displays for notifying the user of the operation condition of the image recording system 14 and the contents input by the user.

The control portion 2 comprises a CPU 13 and non-illustrated parts such as a ROM (read-only memory) for an apparatus control program and a RAM (random-access memory) for storing control data, and collectively manages and controls all the operations associated with the image managing system 14. The control portion 2 has a preprogrammed image information amount storage portion 10, a first recording medium available space storage portion 11, a second recording medium available space storage portion 12, a recording space shortage storage portion 18 and a first recording medium image information amount storage portion 19. Connected to the control portion 2 are the image receiving portion 1, the operation portion 3, the first and the second recording apparatuses 4 and 6, and the display portion 8. The image receiving portion 1 is connected to the first recording apparatus 4. The first recording apparatus 4 is connected to the second recording apparatus 6. The output portion 9 is connected to the first recording apparatus 4 and to the second recording apparatus 6.

Figure 2:
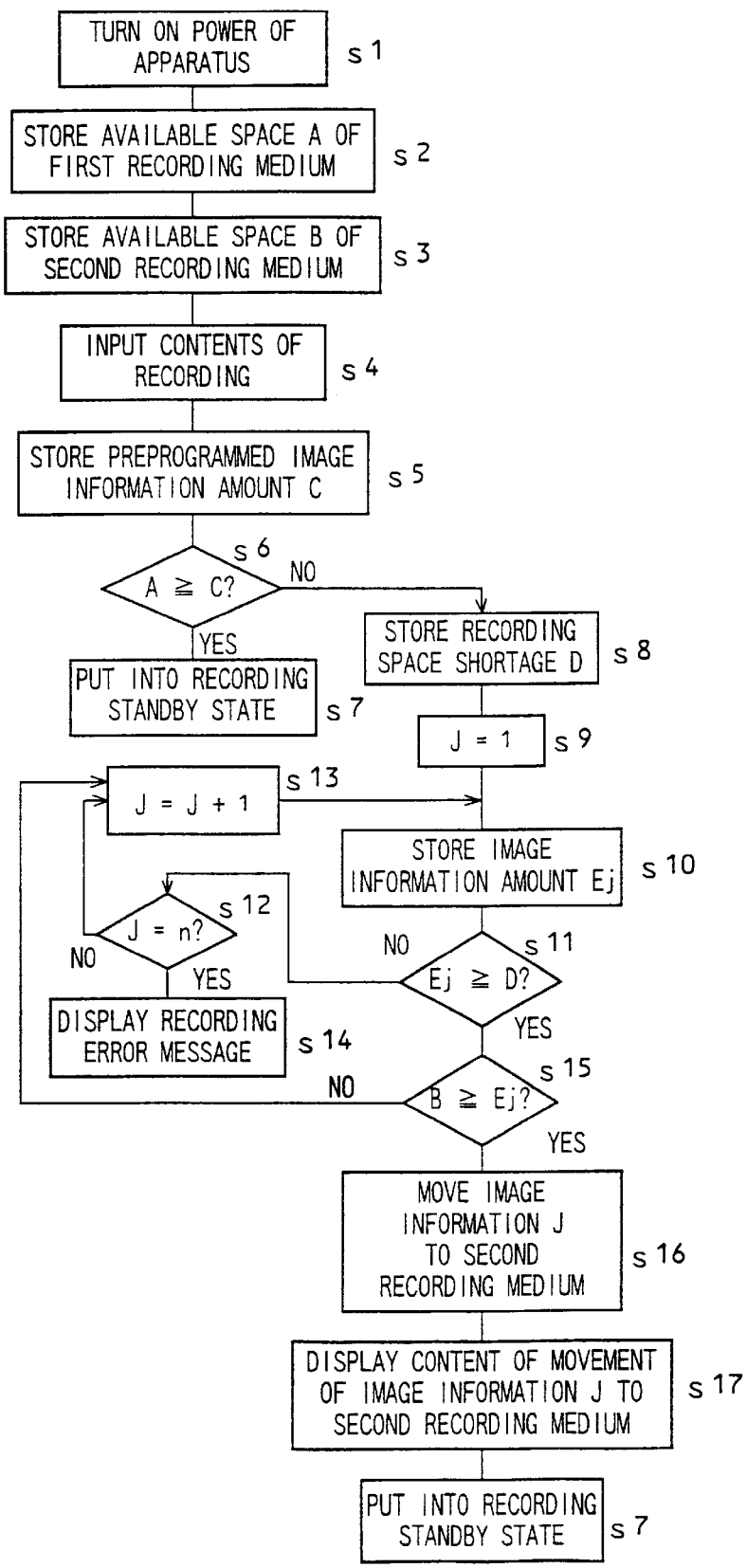
FIG. 2 is a flowchart of an image recording processing performed by the image recording system of the first embodiment.

FIG. 2 is a flowchart of an image recording processing performed by the image recording system 14 of the embodiment. First, at step S1, the power of the apparatus is turned on. At step S2, the available space A of the first recording medium 4a at this point of time is stored in the first recording medium available space storage portion 11 by the first recording medium space managing portion 5. At step S3, the available space B of the second recording medium 6a at this point of time is stored in the second recording medium available space storage portion 12 by the second recording medium space managing portion 7.

At step S4, the user operates the operation portion 3 to input the contents of recording of the image to be recorded. Examples of the input contents include the date of recording, the start time of recording, the end time of recording, the channel to be recorded and the recording mode. The recording mode is a selection between high-quality and large-capacity recording and low-quality and small-capacity recording. Making this selection determines the rate of image information recording onto the recording medium. Since the recording rate and the recording time can be recognized from the input contents, at step S5, the recording capacity required to perform the preprogrammed recording is calculated by the CPU 13. That is, the preprogrammed image information amount C is calculated, and the value is stored in the preprogrammed image information amount storage portion 10.

Then, at step S6, the CPU 13 compares the preprogrammed image information amount C stored in the preprogrammed image information amount storage portion 10 with the available space A of the first recording medium 4a stored in the first recording medium available space storage portion 11 to determine whether or not the available space A of the first recording medium 4a is equal to or larger than the preprogrammed image information amount C. When the available space A of the first recording medium 4a is larger or equal, at step S7, the apparatus is brought into a recording standby state, and when the recording time comes, the image is recorded onto the first recording medium 4a. When the available space A of the first recording medium 4a is smaller than the preprogrammed image information amount C, the process proceeds to step S8. At step S8, the CPU 13 subtracts the available space A of the first recording medium 4a from the preprogrammed image information amount C to calculate the recording space shortage D, and the value is stored in the recording space shortage storage portion 18.

In the first recording medium space managing portion 5, the image information already recorded on the first recording medium 4a is managed by a predetermined order, for example, by ascending order of recording date and time. When a number, n, of pieces of image information are recorded, the ordinal ranks j thereof are 1, 2, . . . and n, and the corresponding ordinal rank is assigned to each piece of image information for management. For example, the image information name with an ordinal rank J is Vj, and the image information amount with an ordinal rank J is Ej.

At step S9, the ordinal rank J of the image information already recorded on the first recording medium 4a is set to 1. At step S10, the amount E1 of the image information of J=1 is stored in the first recording medium image information amount storage portion 19. At step S11, the recording space shortage D is compared with the information amount Ej stored in the first recording medium image information amount storage portion 19 to determine whether or not the information amount E1 stored in the first recording medium image information amount storage portion 19 is equal to or larger than the recording space shortage D. When the information amount E1 is smaller than the recording space shortage D, the process proceeds to step S12 and whether the ordinal rank J equals n or not is determined. In the case where J equals n, it indicates that an amount of image information equal to or larger than the recording space shortage D is not recorded on the first recording medium 4a, and accordingly the process proceeds to step S14 and a preprogrammed recording error message is displayed on the display portion 8 to notify the user that the contents of programming cannot be recorded. When J does not equal n, at step S13, J is set to J+1. Then, the process returns to step S10 and the amount Ej of the next image information is stored in the first recording medium image information amount storage portion 19. When the information amount Ej is equal to or larger than the recording space shortage D at step S11, the process proceeds to step S15 and the information amount Ej stored in the first recording medium image information amount storage portion 19 is compared with the available space B of the second recording medium 6a to determine whether or not the available space B of the second recording medium 6a is equal to or larger than the information amount Ej. When the available space B of the second recording medium 6a is smaller than the information amount Ej, the process returns to step S13. When the available space B of the second recording medium 6a is equal to or larger than the information amount Ej, the process proceeds to step S16. At step S16, the image information Vj on the first recording medium 4a selected at that time is moved to the second recording medium 6a.

Here, the processing of moving the image information Vj is as described below, and these controls are all performed by the control portion 2 controlling the first and the second recording apparatuses 4 and 6. The first recording apparatus 4 reads out the image information Vj on the first recording medium 4a and hands over the image information Vj to the second recording apparatus 6. The second recording apparatus 6 records the received image information Vj onto the second recording medium 6a. After all the image information is recorded onto the second recording medium 6a, the image information Vj on the first recording medium 4a is erased.

Figure 3:
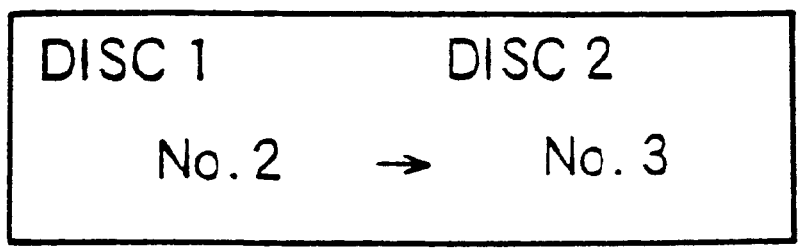
FIG. 3 shows an example of a display provided when image information is moved.

After the movement of the image information Vj to the second recording medium 6a is finished, at step S17, the content of the movement is displayed on the display portion 8. For example, as shown in FIG. 3, the ordinal rank of the moved image information on the first recording medium 4a and the ordinal rank thereof on the second recording medium 6a after the movement are displayed. In this example, the image information V2 on the first recording medium 4a is moved to the second recording medium 6a and assigned an ordinal rank 3. Lastly, at step S7, the apparatus is brought into the recording standby state, and when the recording time comes, the image information is recorded onto the first recording medium 4a.

In this manner, an available space of at least equal to or larger than the preprogrammed image information amount can be secured on the first recording medium 4a, so that the image of which recording is preprogrammed by the user is recorded onto the first recording medium 4a without divided.

Moreover, as described above, when an exchangeable medium such as an optical disk is used as the second recording medium 6a, since image storing capability is excellent, the image information can be moved to the second recording medium 6a for storage when the user wants to store some of the image information recorded on the first recording medium 4a, and preprogrammed recording can be performed even when the user wants to perform preprogrammed recording of an image whose information amount is equal to or larger than the available space of the first recording medium 4a.

Moreover, a plurality of second recording media 6a may be provided like the changer configuration. This increases the possibility that the image information selected to increase the available space of the first recording medium 4a can be moved to the second recording media 6a. In this case, by preprogramming in the control portion 2 which of the recording media the image information on the first recording medium 4a is moved to with priority, the efficiency of use of the second recording media 6a can be increased.

For example, at step S15 of the flowchart of FIG. 2, when the selected image information amount Ej of the first recording medium 4a is compared with the available space B of the second recording medium 6a, as the available space of the second recording medium 6a, a recording medium having a small available space is selected with priority from among the second recording media 6a, and to the medium, the selected image information on the first recording medium 4a is moved.

Moreover, when a larger amount of image information than the recording space shortage is selected from among the pieces of image information recorded on the first recording medium 4a, by selecting a plurality of pieces of image information, the possibility that an available space is created increases. The flowchart in this case is shown in FIG. 4.

Figure 4:
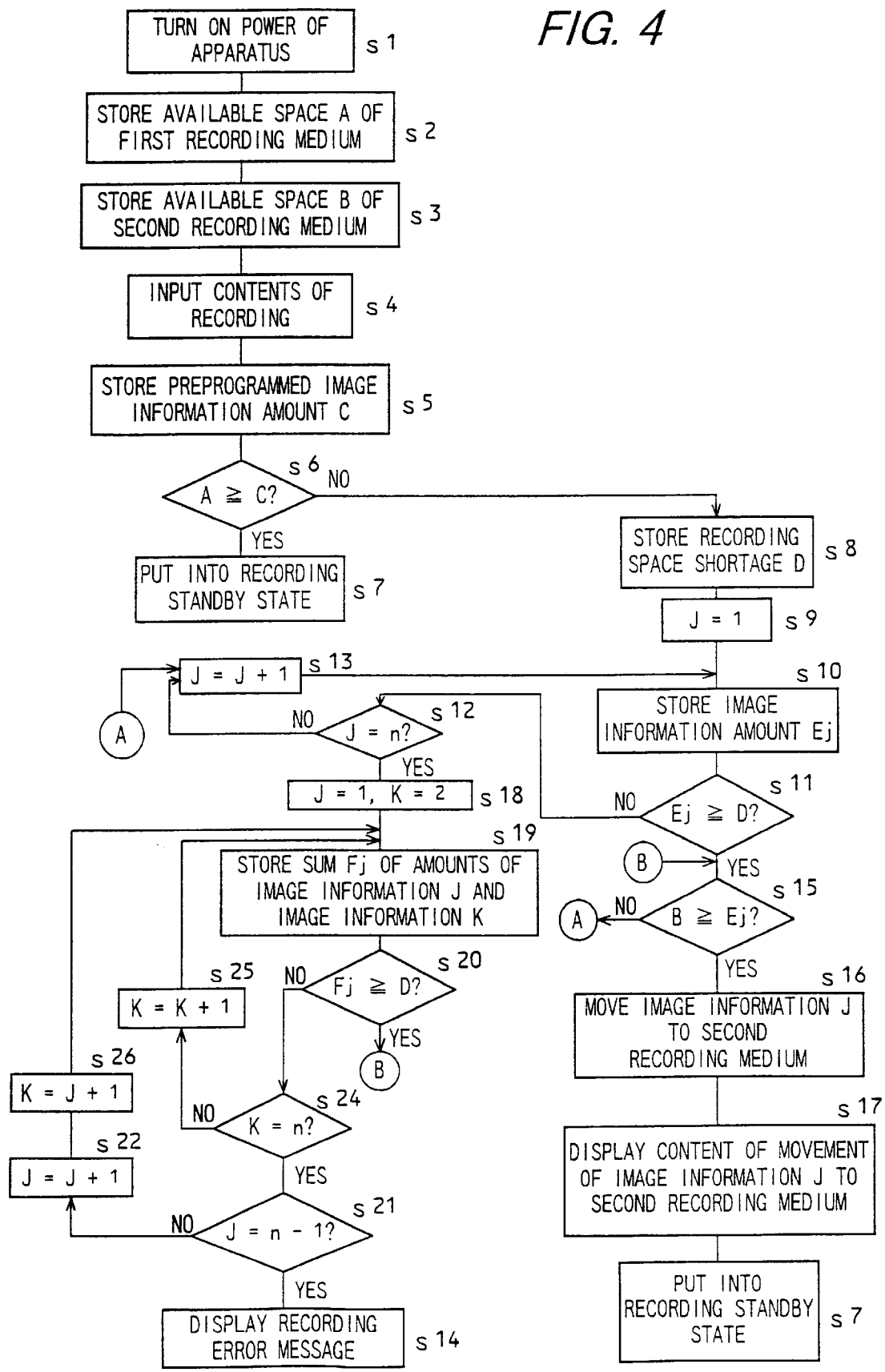
FIG. 4 is a flowchart of an image recording processing in which a plurality of pieces of image information is selected.

The flowchart shown in FIG. 4, in contrast to that of FIG. 2, is provided with additional steps S18 to S22 and S24 to S26 between step S12 and step S14. When J equals n at step S12 of the flowchart of FIG. 2, not an error processing is performed but two pieces of image information are selected from the first recording medium 4a, the sum of the amounts of the two pieces of image information is calculated, and the information amount Fj is stored in the first recording medium image information amount storage portion 19. When the value D of the recording space shortage storage portion 18 is higher, the image information with the ordinal rank 1 and the image information with the ordinal rank 3 are selected next and comparison is performed again. Specifically, at step S18, J is set to 1 and K is set to 2 (K≠J). At step S19, the information amount Fj which is the sum of the information amount Ej and the information amount Ek is stored into the first recording medium image information amount storage portion 19. Then, at step S20, the information amount Fj stored in the first recording medium image information amount storage portion 19 is compared with the recording space shortage D to determine whether or not the information amount Fj is equal to or larger than the recording space shortage D. When the information amount Fj is equal to or larger than the recording space shortage D, the process proceeds to step S15 of FIG. 1. When the information amount Fj is smaller than the recording space shortage D, the process proceeds to step S24. At step S24, whether K equals n or not is determined. When K does not equal n, K is set to K+1, and the process returns to step S19. When K equals n, the process proceeds to step S21 and whether J equals n−1 or not is determined. When J equals n−1, since there is no information amount Fj that is equal to or larger than the recording space shortage D, an error message is displayed, and the processing is ended. When J does not equal n−1, the process proceeds to step S22 and J is set to J+1. Then, the process proceeds to step S26 and K is set to J+1. Then, the process returns to step S19. In addition to the above-described example, three ton pieces of image information may be selected.

Moreover, when the order by which the image information recorded on the first recording medium 4a is managed by the first recording medium space managing portion 5 is decreasing order of image information amount, a large amount of image information is moved to the second recording medium 6a with priority, so that the possibility is obtained that it is unnecessary to move information when recording is preprogrammed next time.

Moreover, when the image information recorded on the second recording medium 6a is reproduced, the reproduction output from the second recording apparatus 6 is output to the output portion 9 of the apparatus.

Figure 5:
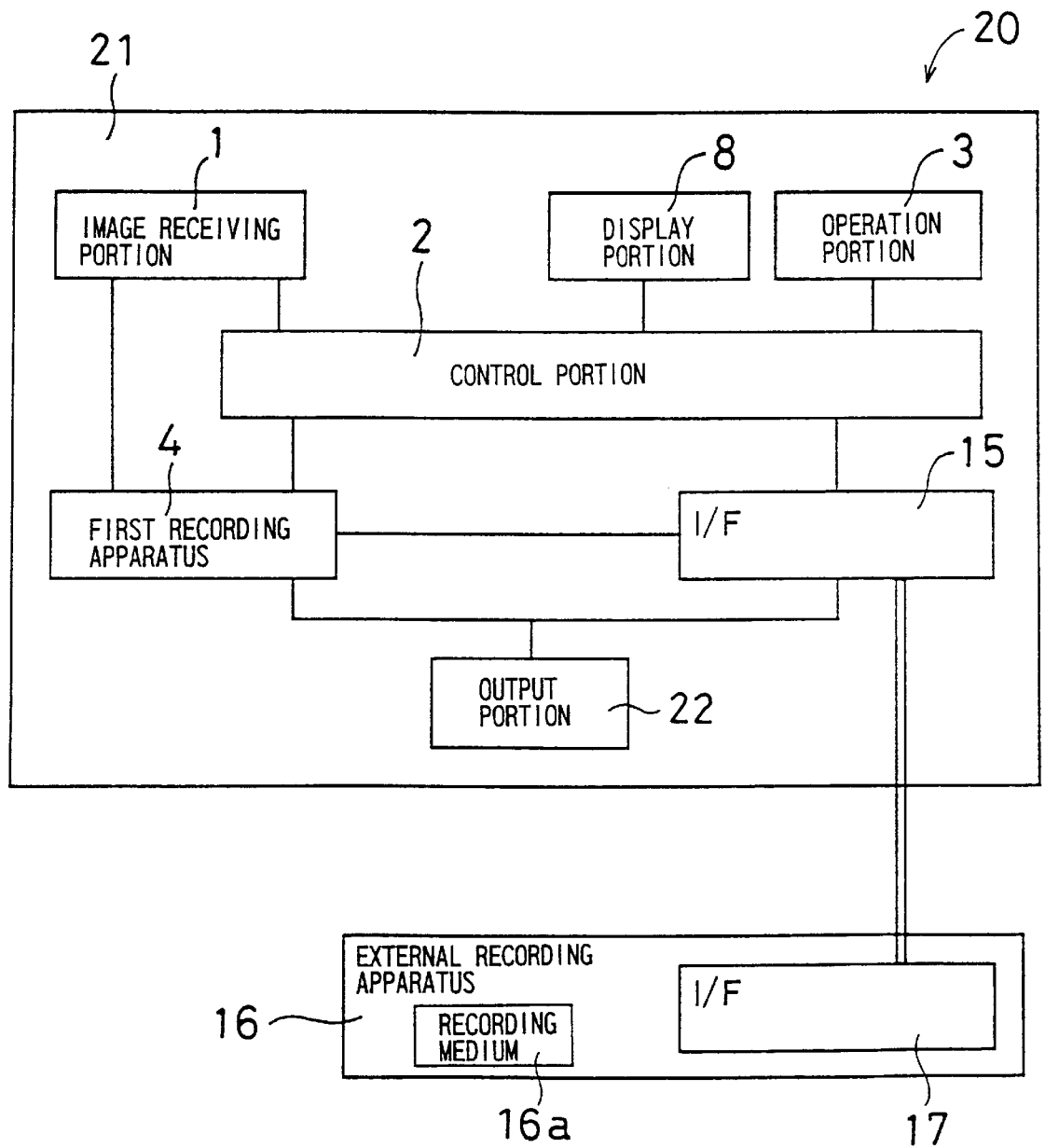
FIG. 5 is a block diagram showing the structure of the image recording system according to a second embodiment of the invention.

Further, a recording medium in a recording apparatus connected to the outside through a network may be used as the second recording medium. FIG. 5 shows the structure of the image recording system 20 according to a second embodiment of the invention. Note that, in this embodiment, the components that play the same or corresponding roles in the first embodiment will be identified with the same reference symbols, and overlapping descriptions will be omitted.

The image recording system 20 of the invention includes an image recording system body 21 and an external recording apparatus 16. The image recording system body 21 has basically the same structure as the image recording system 20 shown in FIG. 1 and comprises an image receiving portion 1, a control portion 2, an operation portion 3, a first recording apparatus 4, a display portion 8, and an output portion 22. In this embodiment, the second recording medium 6a and second recording apparatus 6 as shown in FIG. 1 are absent in the image recording system body 21; instead, an interface portion 15 for connection to the external recording apparatus 16 is provided. That is, connected to the control portion 2 are the image receiving portion 1, the operation portion 3, the first recording apparatus 4, the display portion 8, and the interface portion 15. The first recording apparatus 4 is connected to the interface portion 15. The output portion 22 has basically the same structure as the output portion 9 shown in FIG. 1 and is connected to the first recording apparatus 4 and to the interface portion 15.

The external recording apparatus 16 has a recording medium 16a serving as the second recording medium and also has an interface portion 17 for connection to the image recording system body 21. The image recording system body 21 is connected, through the interface portions 15 and 17, to the external recording apparatus 16 so that they are in communication with each other.

In this construction, through the interface portions 15 and 17, the available space of the recording medium 16a of the external recording apparatus 16 is detected and the image information on the first recording medium 4a can be moved to the recording medium 16a of the external recording apparatus 16.

Figure 6:
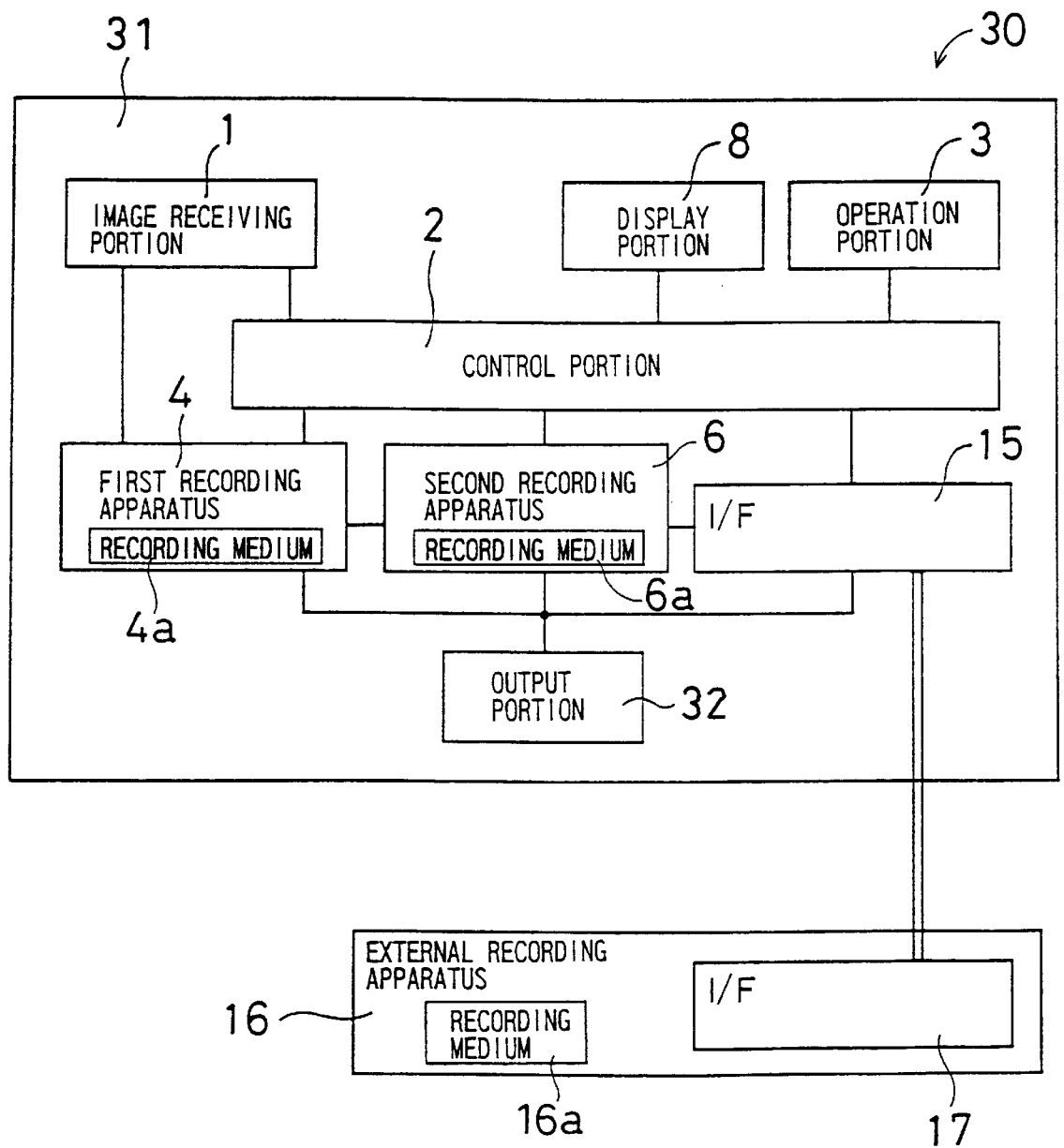
FIG. 6 is a block diagram showing the structure of the image recording system according to a third embodiment of the invention.

FIG. 6 is a block diagram showing the structure of the image recording system 30 according to a third embodiment of the invention. Note that, in this embodiment, the components that play the same or corresponding roles in the above-described embodiments will be identified with the same reference symbols, and overlapping descriptions will be omitted. The image recording system 30 includes an image recording system body 31 and an external recording apparatus 16. The image recording system body 31 has basically the same structure as the image recording system 20 shown in FIG. 1 and comprises an image receiving portion 1, a control portion 2, an operation portion 3, a first recording apparatus 4, a display portion 8, and an output portion 32. The image recording system body 31 further includes a second recording medium 6a, a second recording apparatus 6, and an interface portion 15. That is, connected to the control portion 2 are the image receiving portion 1, the operation portion 3, the first recording apparatus 4, the second recording apparatus 6, the display portion 8, and the interface portion 15. The first recording apparatus 4 is connected to the second recording apparatus 6. The second recording apparatus 6 is connected to the interface portion 15. The output portion 32 has basically the same structure as the output portion 9 shown in FIG. 1, and is connected to the first recording apparatus 4, to the second recording apparatus 6, and to the interface portion 15. The connection relationship among the first recording apparatus 4, the second recording apparatus 6, and the interface portion 15 is not limited to the above. For example, it is also possible to connect the first recording apparatus 4 to the interface portion 15, and to connect the interface portion 15 to the second recording apparatus 6.

The external recording apparatus 16 has another recording medium 16a and an interface portion 17 for connection to the image recording system body 21. The image recording system body 21 is connected, through the interface portions 15 and 17, to the external recording apparatus 16 so that they are in communication with each other.

Figure 7:
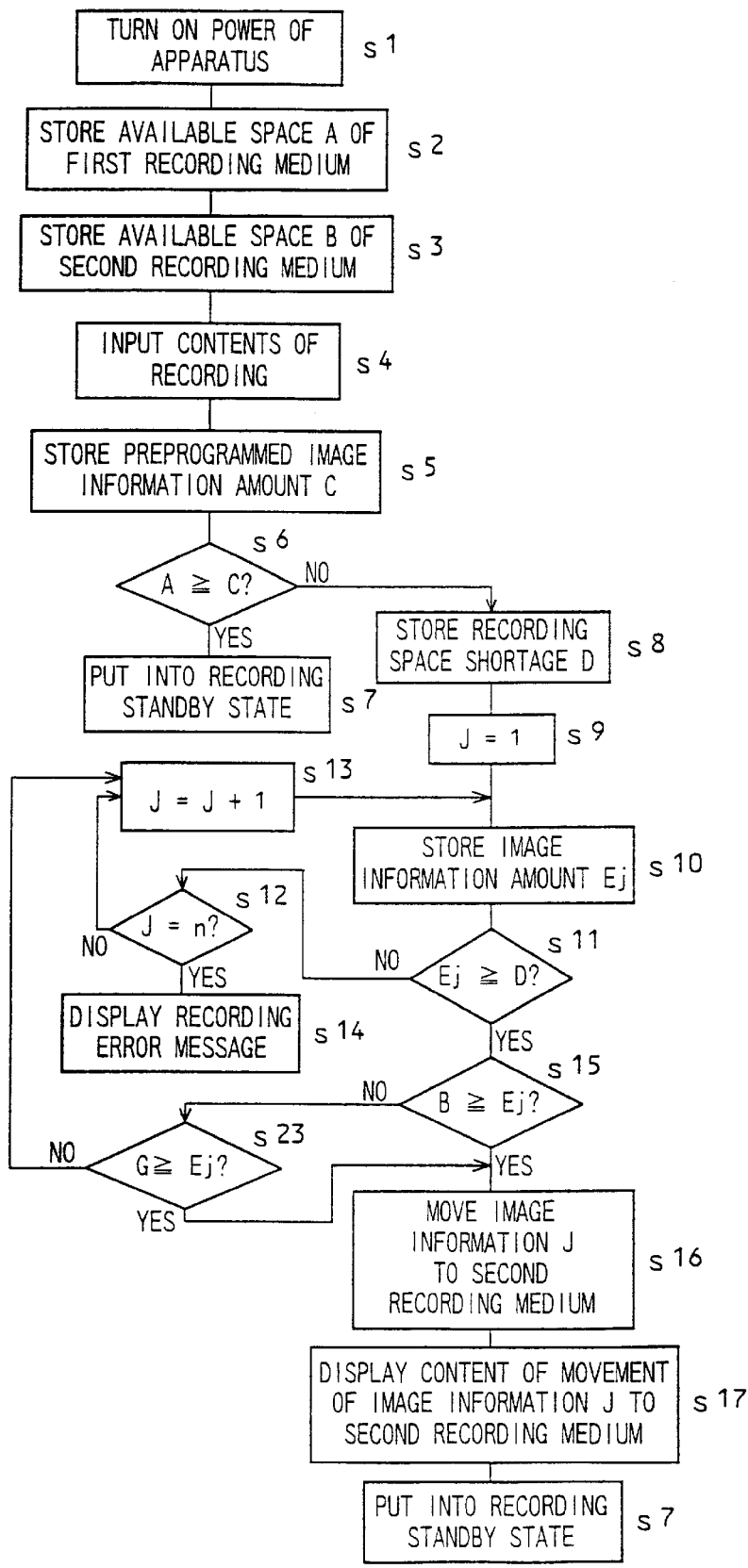
FIG. 7 is a flowchart of an image recording processing performed by the image recording system of the third embodiment.

In this construction, as shown in FIG. 7, by providing an additional step S23 between steps S15 and S13 shown in the flowchart of FIG. 2, selection of destination of the image information can be made.

As shown in FIG. 7, when the available space B of the second recording medium 6a is smaller than the image information amount Ej of the selected image information Vj at step S15 of FIG. 2, step S23 is provided to compare the image information amount Ej with the available space G of the recording medium 16a of the external recording apparatus 16. When the available space G of the recording medium 16a of the external recording apparatus 16 is equal to or larger than the selected image information amount Ej, the process proceeds to step S16 of FIG. 2 and the processing is continued. By doing this, the medium to which the selected image information is to be moved can be selected from among a larger number of media, so that the occurrence of preprogrammed recording errors is reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image recording system comprising:
   a first recording medium for image information recording;
   a second recording medium for image information storage;
   means for inputting image information transmitted from an outside, to the first recording medium;
   means for preprogramming to record image information;
   means for recognizing an amount of the image information preprogrammed to be recorded;
   means for managing an amount of each piece of image information recorded on the first recording medium and an available space of the first recording medium;
   means for managing an available space of the second recording medium;
   means for obtaining a recording space shortage for preprogrammed information by subtracting the available space of the first recording medium from the amount of the image information preprogrammed to be recorded;
   means for comparing the available space of the first recording medium, the preprogrammed image information amount, the recording space shortage for preprogrammed information, the amount of the image information already recorded on the first recording medium and the available space of the second recording medium;
   means for, in response to a comparison result of the comparing means, selecting a larger amount of image information than the recording space shortage for preprogrammed information, from the image information recorded on the first recording medium; and
   means for moving the image information selected by the selecting means from the first recording medium to the second recording medium.

2. The image recording system of claim 1, further comprising:
   means for providing a display indicating that the selected image information has been moved from the first recording medium to the second recording medium.

3. The image recording system of claim 1, further comprising:
   a plurality of the second recording media; and
   means for managing an available space of each of the second recording media.

4. The image recording system of claim 1, further comprising:
   a plurality of the second recording media;
   means for managing an available space of each of the second recording media; and
   means for determining an order of priority of the plurality of the second recording media in moving the selected image information from the first recording medium to the second recording media.

5. The image recording system of claim 1, further comprising:
   means for selecting a plurality of pieces of image information from the image information recorded on the first recording medium, amounts of the plurality of pieces of image information being larger than the recording space shortage.

6. The image recording system of claim 1, further comprising:
   means for carrying out reproduction of the image information moved from the first recording medium to the second recording medium, from the second recording medium.

7. A method for controlling an image recording system having a function of receiving image information and a function of performing preprogrammed recording of the received image information onto a plurality of recording media, the method comprising the steps of:
   detecting an available space A of a first recording medium, an available space B of a second recording medium and a preprogrammed image information amount C necessary for preprogrammed recording;
   comparing the available space A of the first recording medium and the preprogrammed image information amount C;
   obtaining, when the preprogrammed image information amount C is larger than the available space A of the first recording medium, an amount of shortage of recording space for preprogrammed image information D by subtracting the available space A of the first recording medium from the preprogrammed image information amount C;
   detecting amounts Ej (j is a natural number) of pieces of image information already stored on the first recording medium, and from the pieces of image information, selecting a piece of image information an amount of which is equal to or larger than the amount of shortage of recording space for preprogrammed image information D;
   moving the selected piece of image information to the second recording medium when the available space B of the second recording medium is equal to or larger than the amount Ej of the selected piece of image information; and
   permitting the preprogrammed recording onto the first recording medium.

8. The method for controlling the image recording system of claim 7, wherein the movement of image information from the first recording medium to the second recording medium is carried out in decreasing order of image information amount.

* * * * *